Figure 1:
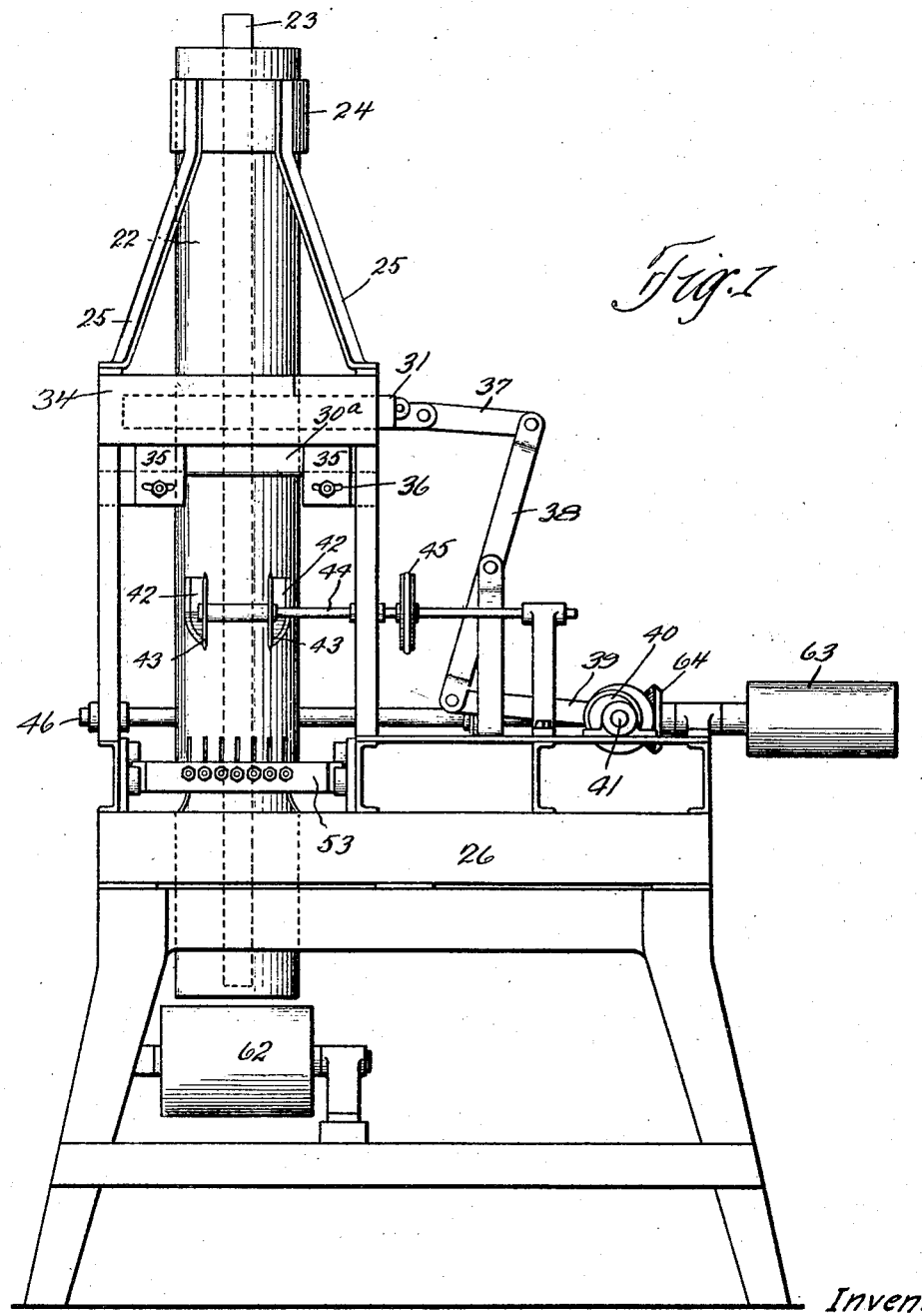

May 15, 1928.

R. B. TAYLOR 1,670,084

METHOD AND MACHINE FOR CUTTING PINEAPPLE INTO STRIPS

Filed June 6, 1927     6 Sheets-Sheet 1

Inventor
R. B. Taylor
By Hull Brock & West
Attys.

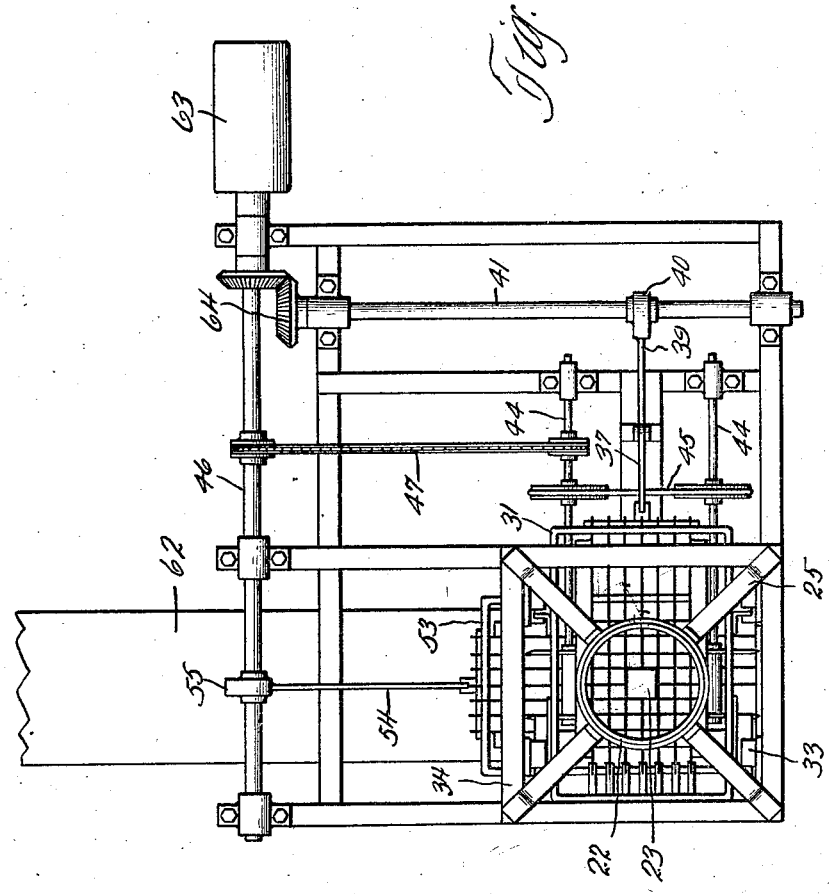

May 15, 1928. 1,670,084
R. B. TAYLOR
METHOD AND MACHINE FOR CUTTING PINEAPPLE INTO STRIPS
Filed June 6, 1927 6 Sheets-Sheet 3
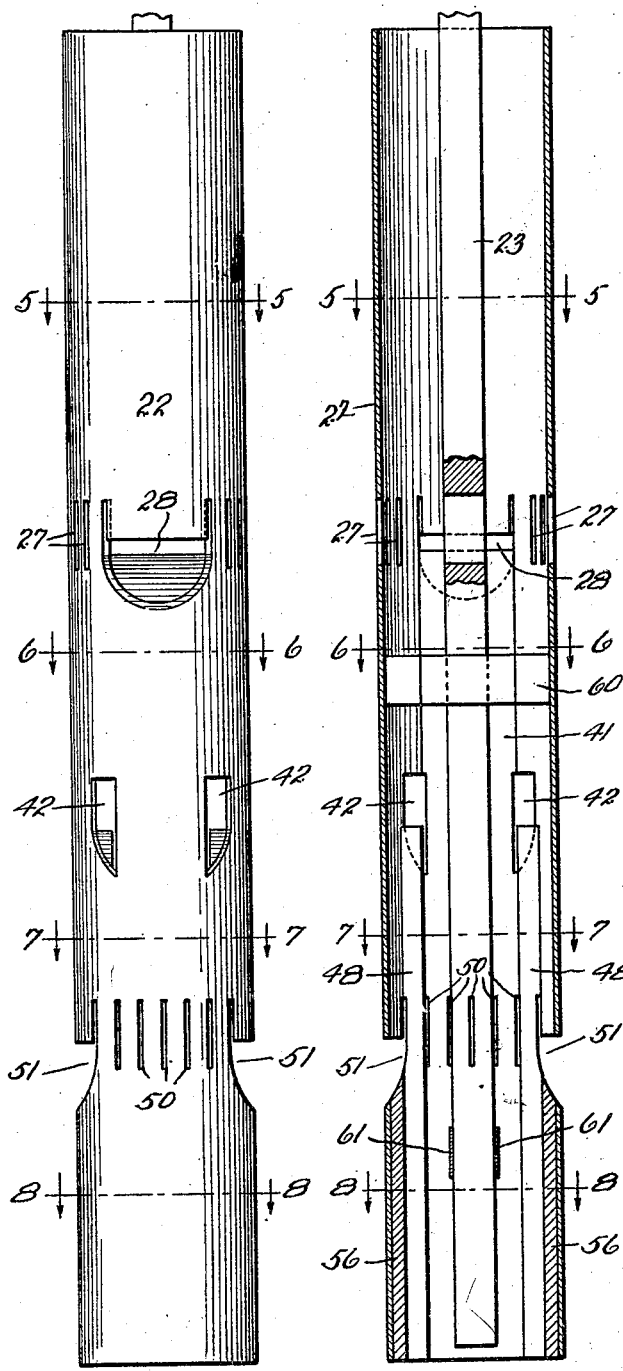
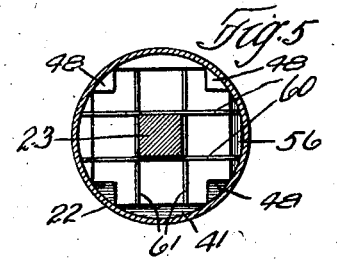
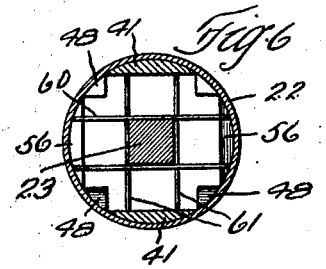
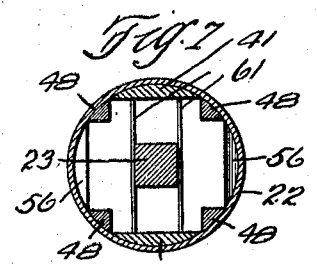
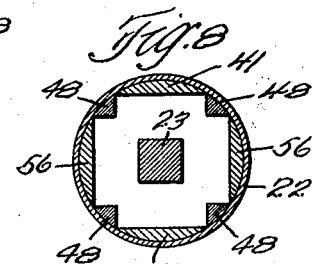
Inventor
R. B. Taylor
Hull Brock & West
Attorney May 15, 1928.
R. B. TAYLOR
1,670,084
METHOD AND MACHINE FOR CUTTING PINEAPPLE INTO STRIPS
Filed June 6, 1927
6 Sheets-Sheet 4
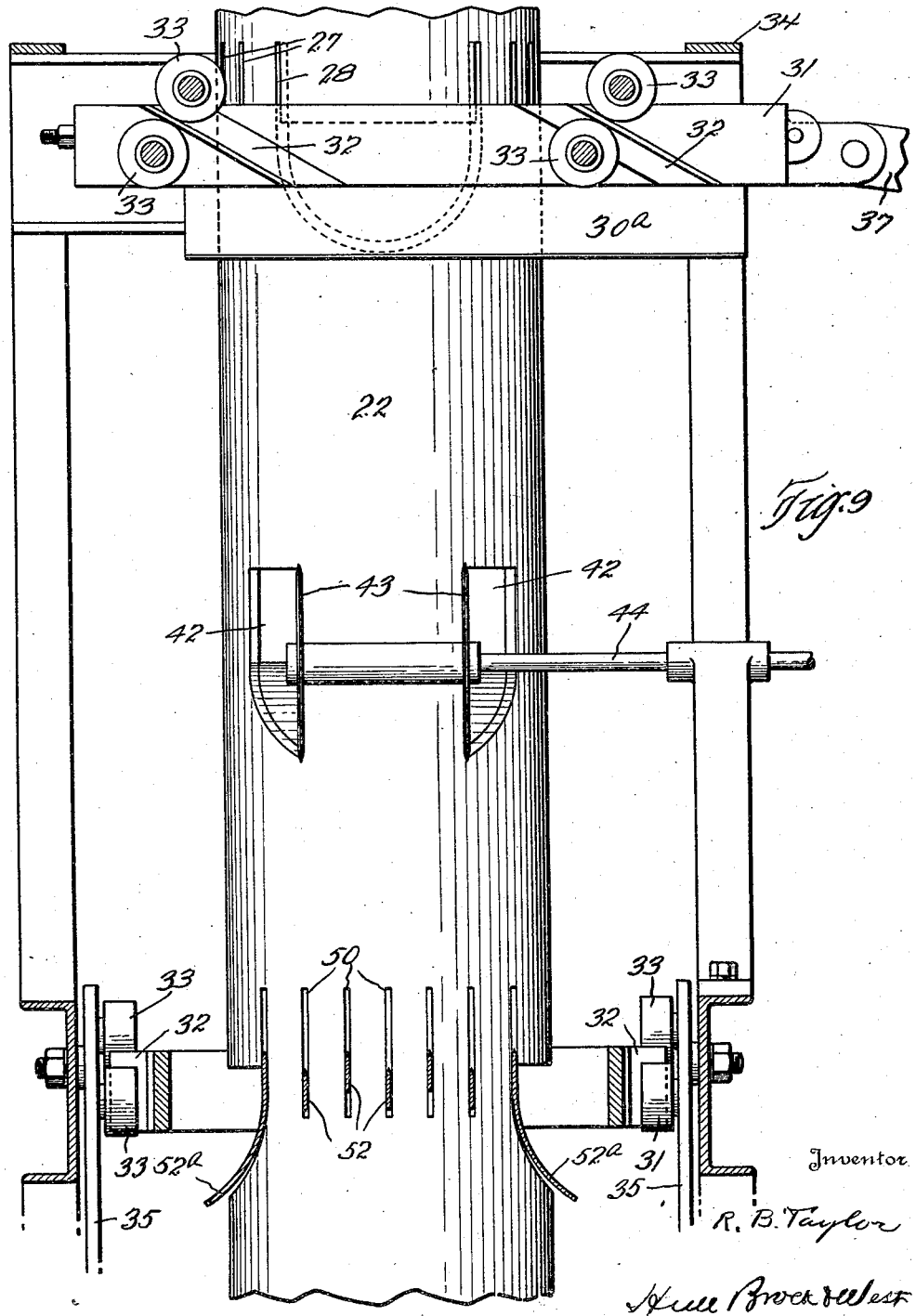

May 15, 1928.　　　　　　　　　　　　　　　1,670,084
R. B. TAYLOR
METHOD AND MACHINE FOR CUTTING PINEAPPLE INTO STRIPS
Filed June 6, 1927　　　6 Sheets-Sheet 5
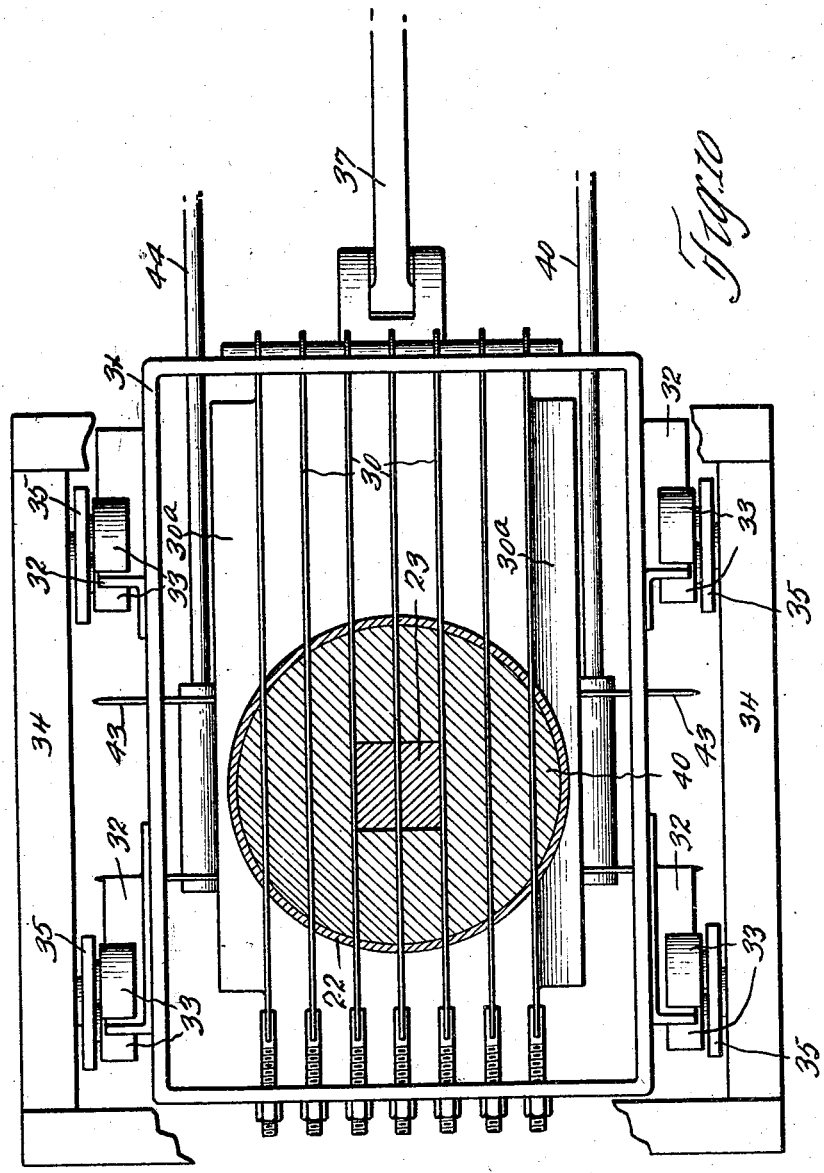
Inventor
R. B. Taylor
By Hull Brock & West
Attorney

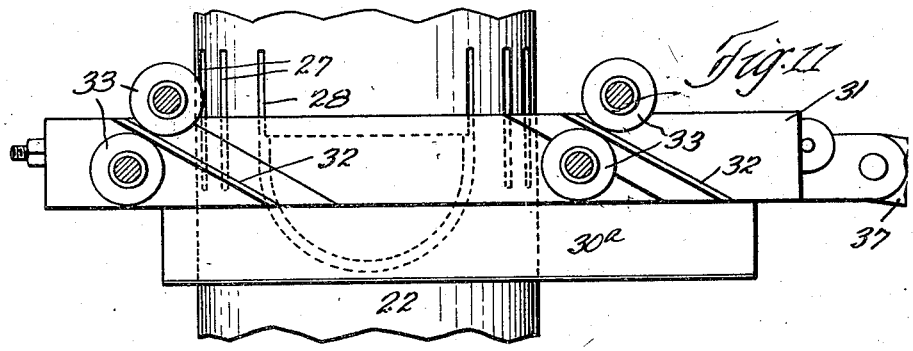
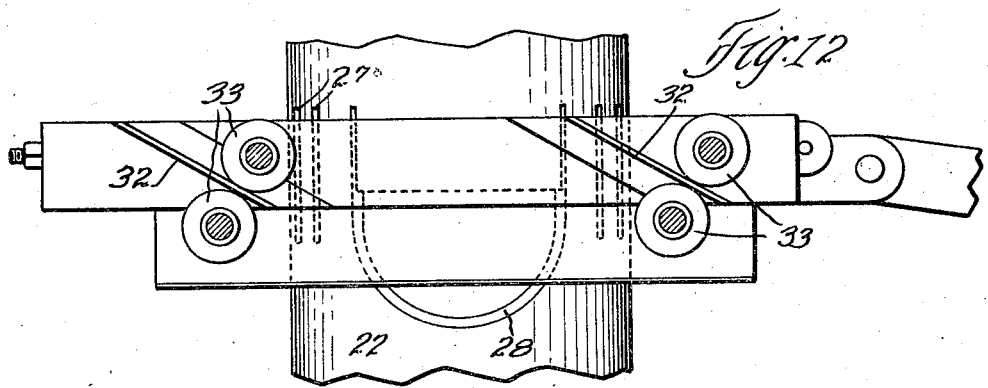
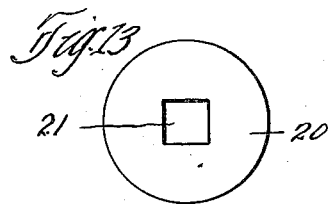
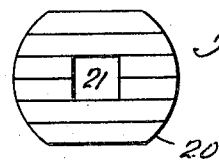
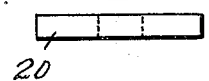
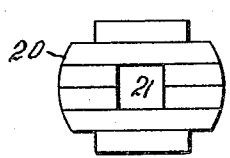
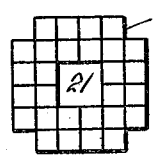
Inventor
R. B. Taylor Patented May 15, 1928.

1,670,084

UNITED STATES PATENT OFFICE.

ROBERT BROOKS TAYLOR, OF KAPAA, ISLAND OF KAUAI, TERRITORY OF HAWAII, ASSIGNOR TO THE CLEVELAND FRUIT JUICE COMPANY, OF CLEVELAND, OHIO, A CORPORATION OF OHIO.

METHOD AND MACHINE FOR CUTTING PINEAPPLE INTO STRIPS.

Application filed June 6, 1927. Serial No. 196,655.

This invention is a novel method and apparatus for cutting pineapple into cubes. Heretofore pineapples have been cored, cut transversely into slices and packed into cans or containers ready for use. These transverse slices have also been cut into segments. These segments, however, are quite large and for salads and the like it is desirable to have the pieces of pineapple in the form of cubes. Heretofore it has been found impossible to produce these cubes due to the fact that pineapple has a definitely defined fiber structure which resists the ordinary cutting or chopping operation and all efforts heretofore made to cut pineapple into cubes have resulted in tearing or disintegrating the fruit to such an extent that it has not been produced as a commercial commodity.

By the present method and apparatus I am able to cut the pineapple into definite sizes of cubes and by a continuous operation feed the sliced and cubed mass through the machine and deliver the same in proper order to an endless conveyor for packing purposes.

With these objects in view the invention consists in the various steps, and in the various features of construction and in the manner of combining or arranging the same all of which will be fully described hereinafter and set forth in the appended claims.

In the drawings forming a part of this specification, Fig. 1 is a side elevation of a machine embodying my invention; Fig. 2 is a top plan view of the same; Fig. 3 is a side view of the tube or cylinder through which the sliced and cubed pineapple is passed; Fig. 4 is a vertical longitudinal sectional view of the same; Fig. 5 is a transverse sectional view on the line 5—5 of Figs. 3 and 4; Fig. 6 is a transverse sectional view on the line 6—6 of Figs. 3 and 4; Fig. 7 is a transverse sectional view on the line 7—7 of Figs. 3 and 4; and Fig. 8 is a transverse sectional view on the line 8—8 of Fig. 4; Fig. 9 is a side elevation partly in section on an enlarged scale showing the knife carrying frames, pineapple carrying tube or cylinder and the rotary knives for cutting out the corners of the pineapple; Fig. 10 is an enlarged plan view of one of the knife carrying frames, the tube or cylinder and the sliced pineapple being shown in section; Fig. 11 is a detail view showing the knife carrying frame in its position at the beginning of its stroke and Fig. 12 is a similar view showing the knife carrying frame at the compression of its stroke; Fig. 13 is a plan view of one of the slices of pineapple as it enters the machine and Fig. 14 is an edge view of the same; Fig. 15 is a plan view of the slice after being operated upon by the first set of knives; Fig. 16 is a plan view of the slice after the rotary knives have removed the corners; and Fig. 17 is a plan view of the slice completely cubed as it is delivered to the endless conveyor arranged at the lower end of the tube or cylinder.

It will be understood that the pineapples are first pared into the form of a cylinder, cored and cut transversely into slices 20 and in practice the central opening produced by the coring operation as indicated at 21 may be either round or square and for the purpose of this description I have illustrated a square opening. These cored slices 20 are fed into the top of a tube or cylinder 22 in compact superposed order, there being a centrally disposed tube 23 extending from the top to the bottom of the tube or cylinder as shown and which fits into the central opening 21 and serves as a guide for the mass as the same is fed downwardly through the machine and it will be understood that any desired means may be employed if necessary to maintain pressure upon the mass for the purpose of obtaining the proper passage through the tube. This tube or cylinder is supported by means of a collar 24 to which are attached the supporting legs 25 resting upon a frame, portions of which serve as guides for the knife carrying frames, hereinafter referred to, said frame in turn being supported upon the main frame 26. The tube 23 instead of being made continuous from top to bottom could be made in sections if desired.

At definite points in the tube or cylinder 22 there are produced a series of vertical slots 27 and openings 28 and working through these slots and openings are the cutting knives or blades 30 arranged longitudinally in a frame 31 and upon the exterior of the sides of the frame there are arranged in inclined order the angle irons 32 which work between the rollers 33 carried by horizontal members 34 of the supporting frame previously referred to. These rollers 33 are mounted upon adjustable blocks 35 slotted at 36 whereby adjustment can be had for the purpose of taking up wear.

The frame 31 is reciprocated horizontally by means of the pitman 37 which in turn is operated by the lever 38 receiving motion from a second pitman 39 operated from an eccentric 40 by the shaft 41. Inasmuch as the frame 31 is provided with inclined guiding arms at opposite sides thereof travelling between the rollers 32, the frame will have a movement transverse with reference to the tube or cylinder and the pineapple slice contained therein and also a movement longitudinal with reference to these parts, that is to say, there will be both a horizontal and at the same time a vertical movement.

Inasmuch, therefore, as the cutting blades or knives work through the slots and openings in the tube or cylinder the downwardly moving slice will come in contact with said knives and will be cut by the combining transverse and longitudinal movement, and this double movement thus produced I find ample to make a perfectly clean cut through the pineapple notwithstanding the fibrous nature of the pineapple. Upon the return movement the motion of the knives is reversed, that is to say, it is moved horizontally in the reverse direction and also downwardly.

This first cutting operation cuts the pineapple slice into parallel strips and also cuts off the side sectors indicated at 40 and the side knives are each formed with downwardly extending portions 30$^a$ curved outwardly as shown and which direct the side sectors 40 out through the openings 28 cut in the sides of the tube. The upper portion of the tube is circular in shape to accommodate the circular shape of the superposed pineapple slices but after the side sectors have been removed their place is taken up by guide fillers 41 arranged at opposite sides of the interior of the tube or cylinder extending entirely to the bottom. At points in the cylinder below the slots 27 and openings 28 I produce openings 42 in which operate the rotary cutting knives 43 mounted upon the horizontal shafts 44 connected by a crossbelt 45 and ribbon from the shaft 46 to the endless chain 47. These rotary knives cut the corners from the pineapple and discard the same upon the exterior of the tube or cylinder, these cuts being most clearly indicated in Fig. 16, the condition of the slice prior to these cuts being made being indicated most clearly in Fig. 5.

After the corners have been thus removed it is necessary to have the superposed slices further guided and for that purpose I provide four angular guide fillers 48 within the tube as most clearly indicated in Fig. 7. Below the openings 42 there are produced a series of vertical slots 50 and openings 51, these slots 50 and openings 51 being arranged transversely to the slots 27 and openings 28 in the upper portion of the tube and working through these slots and openings are the cutting knives 52 arranged in a frame 53 reciprocated by means of a pitman 54, which in turn is operated by the eccentric 55 mounted on the shaft 46. The movement of the frame 53 is transverse to that of the frame 31 and this frame is provided with angle iron guides exactly the same as the upper frame, these guides working between rollers carried also by the blocks 35 and connected to the lower horizontal member of the supporting frame. The side knives of the lower frame are also provided with extensions 52$^a$ for the purpose of discarding the side sectors which are cut off by the side knives leaving the slice in the form indicated in Fig. 17.

In practice I prefer to arrange the cutting blades or knives in staggered relation, that is, alternating one above the other as most clearly shown in Fig. 9 as I have found that such arrangement improves the cutting action and avoids all possibility of crowding and tearing the pineapple. Below the slots 50 and openings 51 the guide fillers 48 occupy the spaces of the removed corners and there are additional side fillers 56 as most clearly shown in Fig. 8 to take the place of the side sectors removed by the side knives of the lower frame.

The central guide tube 23 is positioned in the tube or cylinder 22 by means of two parallel supports 60 which are secured to the tube or cylinder 22 and pass through the central guiding tube 23, these supports being as thin as the cutting blades and having their upper edges sharpened so that the divided slices will pass down between them, and at the lower end similar supports 61 are provided arranged at right angles to the supports 60. The cubed slices drop upon the endless conveyor 62 and are conveyed to the containers for packing. The shaft 46 has a pulley 63 mounted upon the end thereof and bevel gears 64 transmit the motion from the shaft 46 to the shaft 41. In this manner all the working parts are driven from a single power shaft.

It will be understood that certain changes in the operating mechanism can be made without departing from the broad principle of the invention so long as the knife carrying frames are reciprocated in the manner hereinbefore described, that is to say, given both the transverse and longitudinal movement with reference to the moving mass of pineapple slices.

It will thus be seen that I provide a simple and efficient method and apparatus for quickly subdividing the slices of pineapple into cubes of uniform size. The peculiar movement of the knives is essential in order to provide a clean, clear, uniform cut of the pineapple owing to the peculiar fibrous nature of the same. Any suitable provision can be made for taking care of the discarded side sectors and corners of the pineapple.

Having thus described my invention, what I claim is:—

1. The herein described method of cutting a plurality of pineapple slices into cubes which consists in moving said pineapple slices in a definite direction and bringing the same into contact with knives arranged at right angles to each other, said knives having both transverse and longitudinal movements with reference to the movement of the pineapple slices.

2. The herein described method of cutting a plurality of pineapple slices into cubes which consists in moving a plurality of slices in a definite direction and bringing the same into contact with the cutting knives reciprocating in directions at right angles to each other, said knives having simultaneous transverse and longitudinal movement with reference to the movement of the pineapple slices.

3. The herein described method of cubing pineapple which consists in moving a series of pineapple sections through a container and bringing them into contact with knives arranged at right angles to each other, said knives being moved both transversely and longitudinally with reference to the movement of the pineapple sections.

4. The herein described process which consists in feeding a plurality of pineapple slices in a definite direction and bringing the same into contact with a series of reciprocating knives whereby the slices of pineapple are cut into strips and the side sectors discarded, removing the corners of the slices and finally bringing the strips into contact with reciprocating knives whereby the strips are cut into cubes and the end sectors discarded.

5. In an apparatus of the kind described the combination with a tube or cylinder through which a plurality of superposed slices of pineapple are fed, cutting knives reciprocating through the tube, said cutting knives having both transverse and longitudinal movement with reference to the movement of the pineapple slices, and a second set of reciprocating knives working through the tube or cylinder at right angles to the first named knives, said second set of knives also having both transverse and longitudinal movement with reference to the movement of the pineapple slices.

6. In an apparatus of the kind described, the combination with a tube or cylinder through which a plurality of superposed slices of pineapple are passed, reciprocating cutting knives working through the tube or cylinder, said knives having both transverse and longitudinal movement with reference to the movement of the pineapple slices, rotary cutting knives entering the tube or cylinder at pre-determined points below the reciprocating knives and a second set of reciprocating knives working through the tube or cylinder below the rotary knives and arranged at right angles to the first named cutting knives, said lower cutting knives also having both transverse and longitudinal movement with reference to the movement of the pineapple slices.

7. In an apparatus of the kind described, the combination with a tube or cylinder, of a central guiding tube, reciprocating cutting knives working through the tube or cylinder and having a combined transverse and longitudinal movement, rotary cutting knives entering the tube or cylinder at definite points below the reciprocating knives and a second set of reciprocating knives arranged below the rotary cutting knives, said lower cutting knives being arranged at right angles to the first named cutting knives and also having a combined transverse and longitudinal movement.

8. In an apparatus of the kind described, the combination with a tube or cylinder, of a central guiding tube, a plurality of cutting knives reciprocating through the tube or cylinder and having a combined transverse and longitudinal movement, rotary cutting knives entering the tube or cylinder at definite points below the reciprocating knives, and a second set of reciprocating knives working through the cylinder below the rotary cutting knives and at right angles to the first named reciprocating knives, said lower cutting knives also having a combined transverse and longitudinal movement and guide strips arranged upon the interior of the tube or cylinder to compensate for the portions of the pineapple slices removed by the reciprocating and rotary knives.

9. In an apparatus of the kind described, the combination with a tube or cylinder, of a series of cutting knives reciprocating through said tube or cylinder, rotary cutting knives entering the tube or cylinder at definite points below the reciprocating cutting knives and a second set of reciprocating knives working through the tube or cylinder and arranged at right angles to the first named cutting knives.

10. In an apparatus of the kind described, the combination with a tube or cylinder through which a plurality of pineapple slices can be moved, a plurality of cutting knives working through said tube or cylinder together with means for giving said knives both a transverse and longitudinal movement with reference to the movement of the pineapple slices and a second set of reciprocating knives working through the tube or cylinder at right angles to the first named cutting knives together with means for giving said second set of cutting knives a transverse and longitudinal movement.

11. In an apparatus of the kind described, the combination with a tube or cylinder, of a reciprocating frame, means for imparting a transverse and longitudinal movement to said frame and a plurality of cutting knives carried by said frame, said cutting knives extending through the tube or cylinder.

12. In an apparatus of the kind described, the combination with a tube or cylinder, of an upper reciprocating frame and a lower reciprocating frame, the said frames reciprocating in directions at right angles to each other, means for imparting both a transverse and longitudinal movement to each of said frames and parallel cutting knives carried by said frames and working through the tube or cylinder.

In testimony whereof, I hereunto affix my signature.

ROBERT BROOKS TAYLOR.